(12) United States Patent
Foote et al.

(10) Patent No.: US 7,383,509 B2
(45) Date of Patent: Jun. 3, 2008

(54) AUTOMATIC GENERATION OF MULTIMEDIA PRESENTATION

(75) Inventors: Jonathan T. Foote, Menlo Park, CA (US); Matthew L. Cooper, San Francisco, CA (US); David Michael Hilbert, San Jose, CA (US); William N. Schilit, Menlo Park, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1282 days.

(21) Appl. No.: 10/243,220

(22) Filed: Sep. 13, 2002

(65) Prior Publication Data

US 2004/0054542 A1  Mar. 18, 2004

(51) Int. Cl.
 *G06F 3/00* (2006.01)
(52) U.S. Cl. .................. 715/731; 715/730; 715/723; 715/202; 715/203
(58) Field of Classification Search ............... 715/716, 715/719, 723, 730
 See application file for complete search history.

(56) References Cited

U.S. PATENT DOCUMENTS

| | | | |
|---|---|---|---|
| 5,227,892 A | 7/1993 | Lince ......................... 358/335 |
| 5,598,507 A | 1/1997 | Kimber et al. ............. 395/2.55 |
| 5,636,073 A * | 6/1997 | Yamamoto et al. ........... 360/13 |
| 5,655,058 A | 8/1997 | Balasubramanian et al. ..... 395/2.65 |
| 5,659,662 A | 8/1997 | Wilcox et al. ............. 395/2.54 |
| 5,828,994 A | 10/1998 | Covell et al. ............... 704/211 |
| 5,918,223 A | 6/1999 | Blum et al. ..................... 707/1 |
| 5,920,842 A * | 7/1999 | Cooper et al. .............. 704/503 |
| 5,949,410 A * | 9/1999 | Fung ........................ 715/500.1 |
| 5,969,716 A | 10/1999 | Davis et al. ................. 345/328 |
| 6,058,141 A * | 5/2000 | Barger et al. ............... 375/240 |
| 6,067,126 A * | 5/2000 | Alexander ................... 348/738 |
| 6,243,087 B1 | 6/2001 | Davis et al. ................ 345/328 |
| 6,247,072 B1 * | 6/2001 | Firestone ..................... 710/53 |
| 6,249,280 B1 * | 6/2001 | Garmon et al. ............. 715/723 |

(Continued)

OTHER PUBLICATIONS

Kah-Kay Sung, Tomaso Poggio; "Example-based Learning for View-based Human Face Detection," A.I. Memo No. 1521, C.B.C.L. paper No. 112, Massachusetts Institute of Technology, Artificial Intelligence Laboratory and Center for Biological and Computational Learning; Dec. 1994.

(Continued)

*Primary Examiner*—Kieu D Vu
(74) *Attorney, Agent, or Firm*—Fliesler Meyer LLP (57) ABSTRACT

The present invention provides a system and method for automatically combining image and audio data to create a multimedia presentation. In one embodiment, audio and image data are received by the system. The audio data includes a list of events that correspond to points of interest in an audio file. The audio data may also include an audio file or audio stream. The received images are then matched to the audio file or stream using the time. In one embodiment, the events represent times within the audio file or stream at which there is a certain feature or characteristic in the audio file. The audio events list may be processed to remove, sort or predict or otherwise generate audio events. Images processing may also occur, and may include image analysis to determine image matching to the event list, deleting images, and processing images to incorporate effects. Image effects may include cropping, panning, zooming and other visual effects.

32 Claims, 9 Drawing Sheets

U.S. PATENT DOCUMENTS

| | | | |
|---|---|---|---|
| 6,320,598 B2 | 11/2001 | Davis et al. | 345/648 |
| 6,369,835 B1* | 4/2002 | Lin | 715/726 |
| 6,453,251 B1* | 9/2002 | Fuchs et al. | 702/69 |
| 6,542,869 B1 | 4/2003 | Foote | 704/500 |
| 7,093,191 B1* | 8/2006 | Jain et al. | 715/501.1 |
| 2002/0036694 A1* | 3/2002 | Merril | 348/220 |
| 2002/0133520 A1* | 9/2002 | Tanner | 707/517 |
| 2005/0039219 A1* | 2/2005 | Cooper et al. | 725/134 |

OTHER PUBLICATIONS

Kah-Kay Sung, Tomaso Poggio; "Example-Based Learning for View-Based Human Face Detection," IEEE Transactions on Pattern Analysis and Machine Intelligence, vol. 20, No. 1, Jan. 1998.

H. Zabrodsky, S. Peleg, D. Avnir; "Symmetry as a Continuous Feature," Institute of Computer Science, The Hebrew University of Jerusalem; 91904 Jerusalem, Israel.

U.S. Appl. No. 09/947,385, filed Sep. 7, 2001, Foote.

Arons, B., "SpeechSkimmer: A System for Interactively Skimming Recorded Speech," *ACM Trans. on Computer Human Interaction*, Mar. 1997, vol. 4, No. 1, pp. 3-38. (http://www.media.mit.edu/~barons/tochi97.html).

Bregman, A. S., *Auditory Scene Analysis: Perceptual Organization of Sound*, MIT Press, Cambridge, MS, 1990.

Stephen Chu, et al., *Music Summary Using Key Phrases*, Proc. IEEE International Conference on Acoustics, Speech and Signal Processing, 2000.

T. Cover, et al., Elements of Information Theory, John Wiley & Sons, 1991, pp. 18-19.

Ross Cutler, et al., *Robust Real-Time Periodic Motion Detection, Analysis, and Applications*, IEEE Trans. Pattern Analysis and Machine Intelligence, vol. 22, No. 8, 2000, pp. 781-796.

R. Duda, et al., Pattern Recognition and Scene Analysis, John Wiley & Sons, 1973, pp. 228-237.

Eckmann, J.P. et al., "Recurrence Plots of Dynamical Systems," *Europhys. Lett.*, vol. 4 (9), pp. 973-977, Nov. 1, 1987.

Foote, J., "Content-Based Retrieval of Music and Audio," *SPIE*, 1997, vol. 3229, pp. 137-147.

Foote, J., "Visualizing Music and Audio Using Self-Similarity," *ACM Multimedia '99*, Oct. 1999, Orlando, Florida.

Foote, J.T. and Silverman, H.F., "A Model Distance Measure for Talker Clustering and Identification," pp. I-317-I-320, Apr. 1994, IEEE.

Foote, Jonathan *Automatic Audio Segmentation Using a Measure of Audio Novelty*, Proc. IEEE ICME 2000, pp. 452-455.

D. Forsyth, et al., Computer Vision—A Modern Approach, Chapter 16, "Segmentation Using Clustering Methods," Prentice-Hall, pp. 433-466, http://www.cs.berkeley.edu/~daf/book.html., 2003.

Gish et al., "Segregation of Speakers for Speech Recognition and Speaker Identification," *IEEE*, Jul. 1991, vol. 2, pp. 873-876.

Yihong Gong, et al., *Video Summarization Using Singular Value Decomposition*, Proc. IEEE CVPR, 2000.

Goto, M. and Muraoaka, Y., "A Beat Tracking System for Acoustic Signals of Music," *Proc. ACM Multimedia 1994*, San Francisco, ACM, pp. 365-372.

Thomas Hofmann, *Unsupervised Learning by Probabilistic Latent Semantic Analysis*, Machine Learning, 42, 2001, pp. 177-196.

Kimber, D. and Wilcox, L., "Acoustic Segmentation for Audio Browsers," in *Proc. Interface Conference*, Sydney, Australia, 1996, 10 pp.

Johnson, P., "sci-skeptic FAQ.: The Frequently Questioned Answers" http://www.faqs.org/faqs/skeptic-faq/index.html, Apr. 21, 1996.

Daniel D. Lee, et al., *Learning the Parts of Objects by Non-Negative Matrix Factorization*, Nature, vol. 401, Oct. 21, 1999, p. 788-791.

Rabiner, L. and Juang, B.-H., *Fundamentals of Speech Recognition*, PTR, Prentice Hall, Englewood Cliffs, New Jersey, 1993.

Scheirer, E.D., "Tempo and Beat Analysis of Acoustic Musical Signals," *J. Acoust. Soc. Am.*, vol. 103, No. 1, Jan. 1998, pp. 588-601.

Scheirer, E.D., Using Musical Knowledge to Extract Expressive Performance Information from Audio Recordings, Sep. 30, 1996, Nikos Drakos, Computer Based Learning Unit, University of Leeds (http://sound.media.mit.edu/~eds/papers/html/ijcai95/).

Shepard, R., "Representations of Structure in Similar Data: Problems and Prospects," *Psychometrica*, Dec. 1974, vol. 39, No. 4, pp. 373-421.

Siu et al., "An Unsupervised, Sequential Learning Algorithm for the Segmentation of Speech Waveforms with Multiple Speakers," IEEE, Sep. 1992, pp. II-189-II-192.

Slaney, M., "Auditory Toolbox," Jan. 19, 1999, (http://sound.media.mit.edu/dpwe-bin/mhmessage.cgi/AUDITORY/postings/1999/21).

Sprenger, S., "Time and Pitch Scaling of Audio Signals," Nov. 1999, http://www.dspdimension.com/html/timepitch.html.

G. Strang, Linear Algebra and Its Applications, Harcourt, Brace, Jovanovich, 1988, pp. 432-451.

Sugiyama et al., "Speech Segmentation and Clustering Based on Speaker Features," IEEE, Apr. 1993, pp. II-395-II-398.

George Tzanetakis, et al., *Audio Information Retrieval (AIR) Tools*, Proc. International Symposium on Music Information Retrieval, 2000.

Yair Weiss, *Segmentation Using Eigenvectors: A Unifying View*, Proc. IEEE ICCV 1999, pp. 975-982.

\* cited by examiner

AUTOMATIC GENERATION OF MULTIMEDIA PRESENTATION

REFERENCE TO RELATED APPLICATIONS

The current application is related to the following related United States Patents and Patent Applications, and hereby incorporates them by reference in their entirety:

U. S. patent application Ser. No. 09/569,230, entitled "Methods for the Automatic Analysis of Music and Audio", filed May 11, 2000, inventor Jonathan Foote; and U. S. patent application Ser.No. 10/271,407, entitled "A Method for Automatic Digital Music Summarization", filed on Oct. 15, 2002, inventor by M. Cooper and J. Foote.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally multimedia processing, and more particularly to automatically generating a multimedia presentation from image and audio data.

BACKGROUND OF THE INVENTION

With the developments of computers, digital cameras and the Internet, a new medium for displaying digital images has emerged. Images from digital cameras and other sources are often sent through email, displayed on the Internet, and presented as slide shows. Typically, slide show applications allow a user to choose between viewing images individually, proceeding to the next image upon user input, or viewing images as a slide show where they are consecutively displayed automatically at a constant rate. In a few of these applications, an audio file may be played while simultaneously viewing the slide show.

Though relatively easy to create, these unsynchronized multimedia presentations generated by slide show applications that display images at a constant rate do not retain viewer interest very well. Currently, any synchronization between the image display and audio must be generated manually in these applications. This manual synchronization requires an unreasonably large amount of time to parse information from the audio file and inspect the images manually. What is needed is a system and method for generating a multi-media presentation that automatically synchronizes an audio file and set of images.

SUMMARY OF THE INVENTION

The present invention provides a system and method for automatically combining image and audio data to create a multimedia presentation. In one embodiment, audio and image data are received by the system. The audio data includes a list of events that correspond to points of interest at different times in an audio file. The audio data may also include an audio file or audio stream. The images are then matched to the audio file or stream using the events list.

In one embodiment, the events represent times within the audio file or stream at which there is a certain feature or characteristic in the audio file. In one embodiment, the audio events list may be processed to remove, sort or predict or otherwise generate audio events. The images may also be processed. Image processing may include image analysis to determine image matching to the event list, deleting images, and processing images to incorporate effects. Image effects may include cropping, panning, zooming and other visual effects.

DETAILED DESCRIPTION

The present invention provides a system and method for automatically combining image and audio data to create a multimedia presentation. In one embodiment, audio and image data are received by the system. The audio data includes a list of events that correspond to points of interest in an audio file. The audio data may also include an audio file or audio stream. The images are then matched to the audio file or stream using the time. In one embodiment, events represent times within the audio file or stream at which there is a certain feature or characteristic in the audio file. In one embodiment, the audio events list may be processed to remove, sort or predict or otherwise generate audio events. The images may also be processed. Image processing may include image analysis to determine image matching to the event list, deleting images, and processing images to incorporate effects. Image effects may include cropping, panning, zooming and other visual effects.

Figure 1:
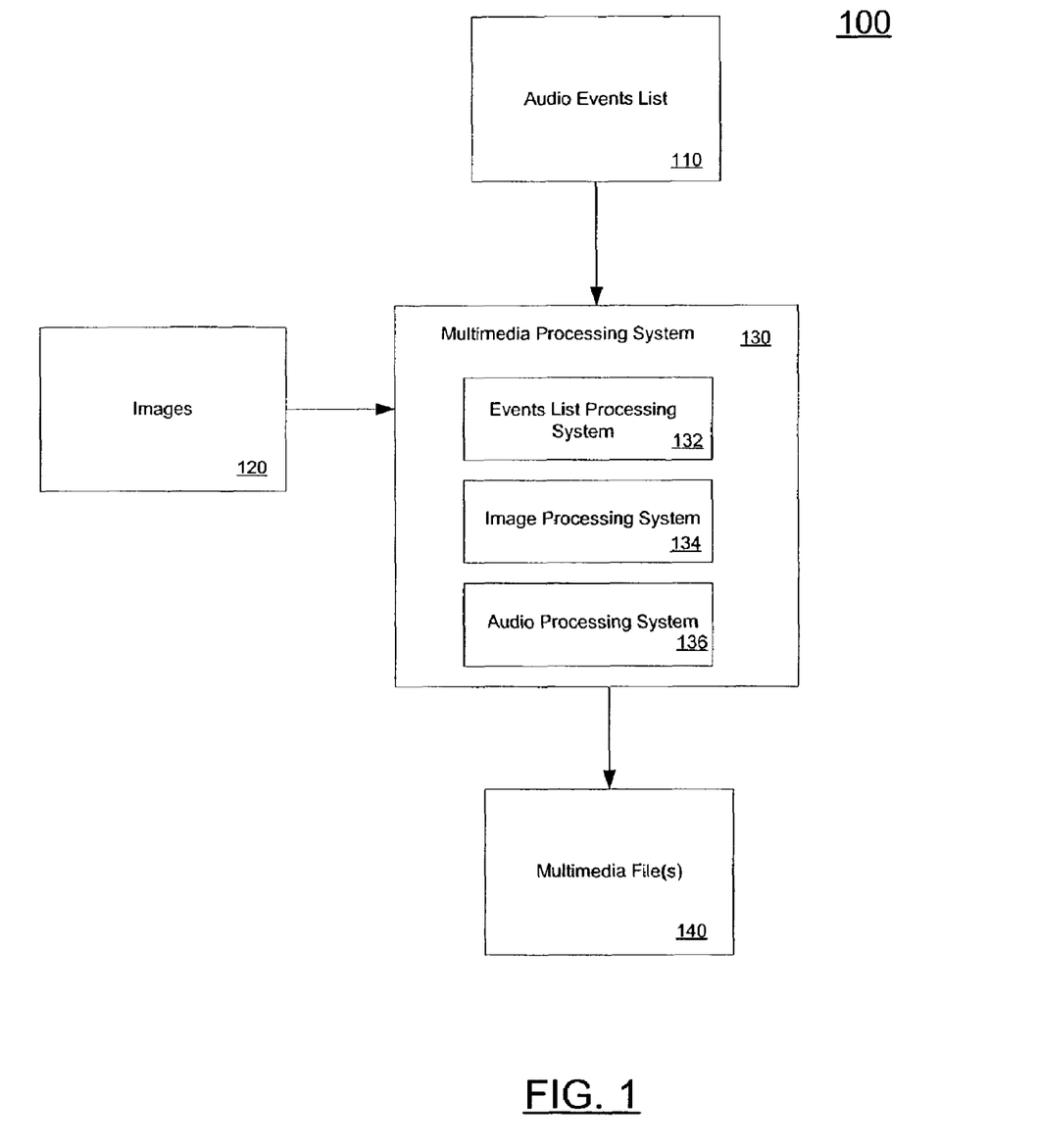
FIG. 1 is an illustration of a system for generating a multimedia presentation in accordance with one embodiment of the present invention.

A system 100 for generating a multimedia presentation is illustrated in FIG. 1. The system includes an audio events list 110, images 120, multimedia processing system (MPS) 130, and multimedia file(s) 140. MPS includes an events list processing system(ELPS) 132, an image processing system (IPS) 134 and an audio processing system (APS) 136. The audio events list 110 and images 120 are received by MPS 130. In one embodiment, the MPS generates an events list from a received audio file. MPS 130 then processes the audio events list and images and outputs a multimedia file or files 140.

Figure 2:
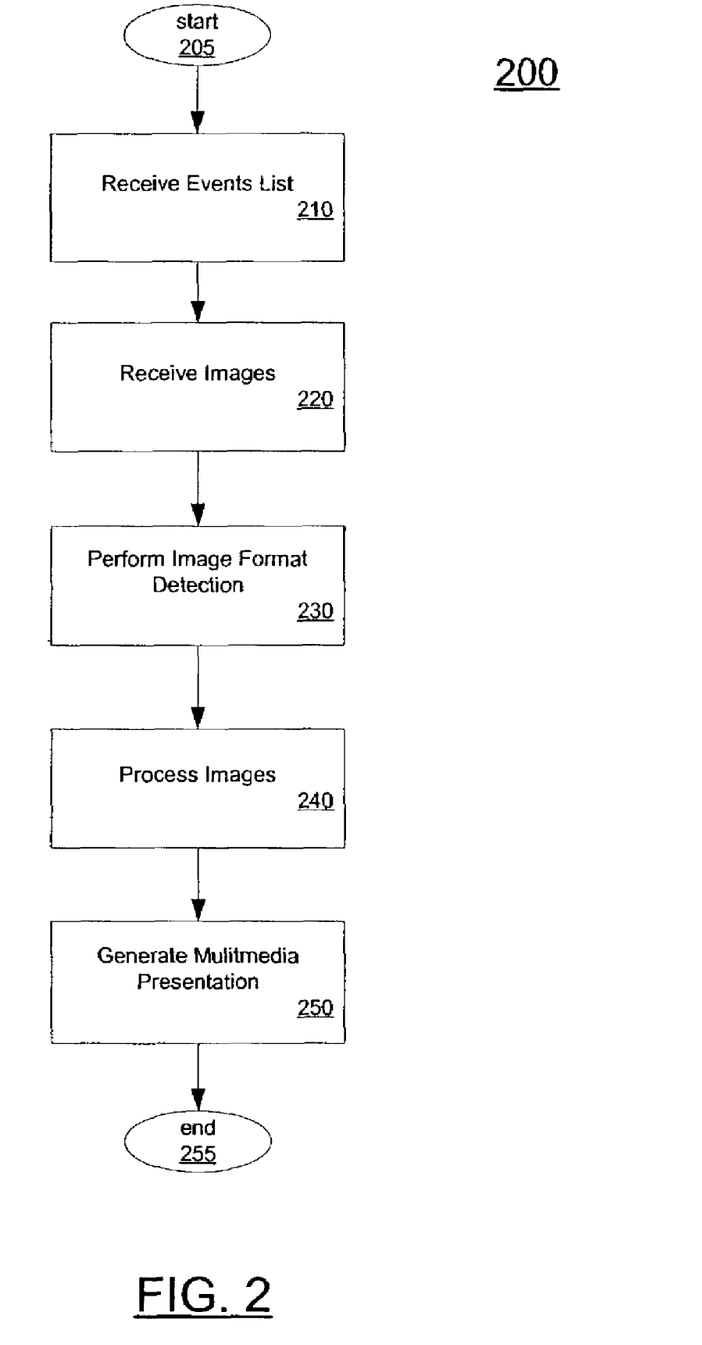
FIG. 2 is an illustration of a method for automatically generating a multimedia presentation in accordance with one embodiment of the present invention.

The operation of system 100 in FIG. 1 is illustrated in method 200 of FIG. 2. Method 200 begins with start step 205. Next, an event list is received in step 210. The list of events includes information from which the time an event occurs in an audio file or stream can be derived. The time information may be time-stamp data or other time related information. In one embodiment, the audio file or stream itself may also be received in step 210. In yet another embodiment, the MPS may generate the events list from a received audio file or audio stream. In this embodiment, event list generation may be performed as discussed in U.S. patent application Ser. No. 09/569,230, entitled "Methods for the Automatic Analysis of Music and Audio", inventor Jonathan Foote, filed May 11, 2000. Though the invention may be implemented to generate a multi-media presentation from either an audio file or audio stream, the invention shall be discussed with regards to an audio file for purposes of illustration. The audio file may include any type of audio content including music, speech, naturally occurring or man-made sounds, or a combination of these. In one embodiment, the APS 136 may detect the format of the audio file received in case the audio should be converted to a different format for use in the multimedia presentation. For example, a multimedia presentation utilizing audio in FLASH format incorporates an mp3 file. Thus, APS 136 may detect if the incoming audio is in .wav format or some format other than mp3.

The event list is a list of events corresponding to the audio file. The occurrence of an event is indicated by a time-stamp or other data indicating the time the event occurs within the audio file. In one embodiment, the events are events of interest or significant changes that occur in the audio file. Examples of events include peaks in the amplitude envelope, changes in audio loudness or timber, crescendos or diminuendos, or some other detectable or predictable audio characteristic. In addition to indicating the time of the event, other information such as identification or quantitative information regarding the event may be received as well. Event identification information may include an indicator that specifies the type of characteristic the event is, or other information providing more detail as to the type, level, or importance of the event. Event quantitative information may include a magnitude rating or a percent of average level achieved for a signal characteristic. In one embodiment, the events list received in step 210 is processed by the ELPS. Events list processing may include truncating a portion of the list, deleting some types of events while retaining others, or other processing. Event list processing is discussed in more detail regarding FIGS. 4 and 5.

Next, the system receives images in step 220. The images may be video images, still frame images, images from a digital camera, images in digital format from a non-digital camera, or some other type of image. The received images can be in any electronic format including jpeg, bmp, gif tiff, and pcx. In one embodiment, format detection is performed on the received images in step 230. The MPS may perform this step images are received in different formats, received in a format that differs from the format of the images in the resulting multimedia presentation, or for other reasons as determined by the particular application. In one embodiment, once the format is recognized, the aspect ratio of the image can be determined as well as any processing required to transform the image to the desired aspect ratio of the multimedia presentation. In one embodiment, the received images are placed into memory for retrieval at a later time by the MPS. The format detection may be an optional step depending on the presentation to be generated. The images are then processed in step 240. Image processing includes processing done to the images to prepare them for inclusion into the multimedia presentation. Image processing is discussed in more detail with respect to FIG. 3 below.

After image processing, a multimedia presentation is generated in step 250. The multimedia presentation is generated by matching the images received in step 220 and optionally processed in step 240 to events listed in the events list received in step 210. In one embodiment, the presentation is generated as a single file or media format. The presentation is provided in a format in which an end-user may play the presentation. Examples of possible multimedia formats include NTSC or PAL VHS video tapes, DVD, MPEG video, FLASH, and SMIL.

In another embodiment, the presentation is generated as a digital control file that references one or more of the audio files, images, and events lists. For example, the control file may include the events list and location of the audio file and processed images. Upon execution, the control file may initiate playback of the audio file and display the first processed image. Audio file playback could be performed by a media player external to the software or hardware implementing the present invention. Alternatively, file playback could be performed by the software or hardware that implements the present invention. Upon playback of the audio file, the control file may receive timing information from the media player regarding the playback of the audio file or maintain an internal timer synchronized with the audio file playback. In either case, the control file detects when the time occurs that is associated with the next event in the event list. Upon occurrence of this time, the control file displays the next image or images to be displayed at that event.

In one embodiment of the present invention, one image is matched to every event in the events list. Thus, at the beginning of the presentation, an initial image is displayed and an audio file is played. At the point in the audio file where the first event occurs, as listed in the events list, a second image is displayed. Upon the occurrence of the second event, a third image is displayed. This process continues until the audio file has played to completion. In another embodiment, an image may be displayed during the occurrence of two or more events. In this case, effects may be configured within the image to take place at the occurrence of one or more event.

In another embodiment, multiple images may be displayed simultaneously during audio playback. In this case, one image may initially be the focus of attention. This may be achieved by displaying a central image surrounded by at least one other image, one image overlapping another image, one image larger than other images, a combination of these, or some other way of emphasizing one of a plurality of images. Once an audio event occurs, the focus may change to another image. In addition to image placement, other methods may be used to generate a focus on one image including adjustment to brightness or incorporating a zooming or rotational movement for an image. After generating the multimedia presentation in step 250, method 200 then ends step 255.

Figure 3:
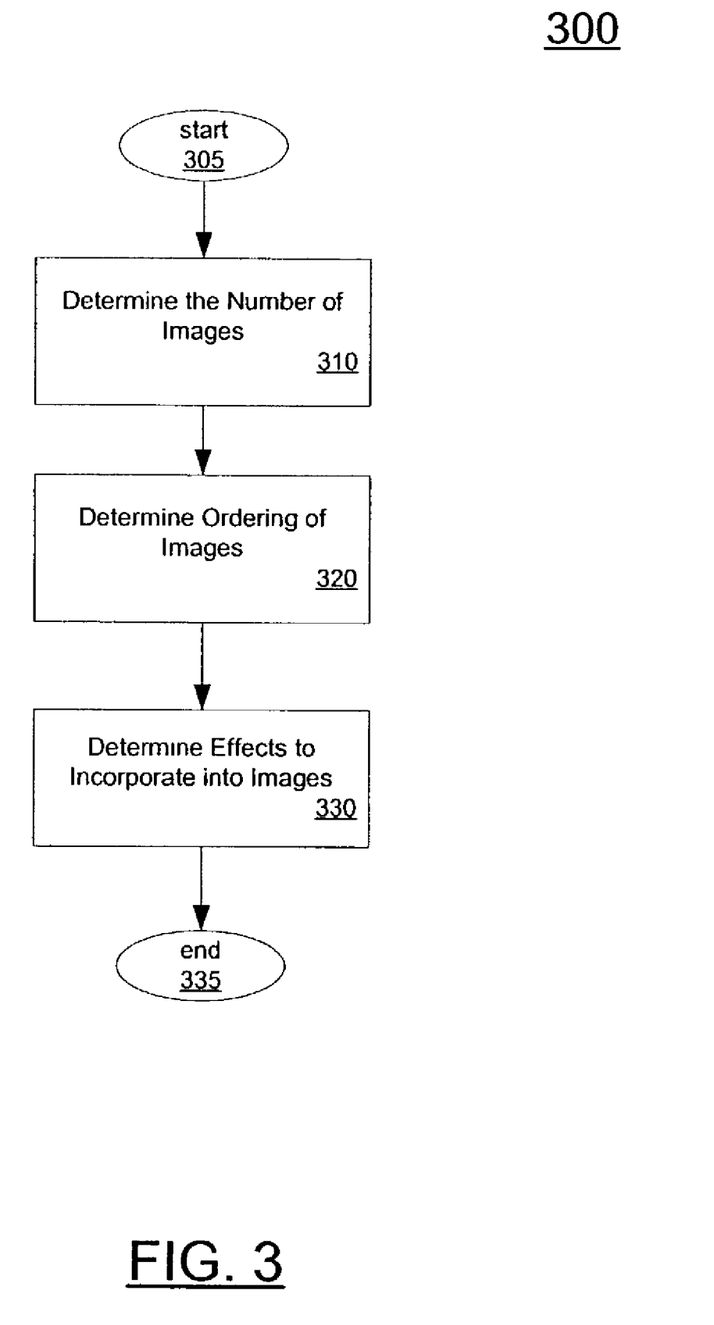
FIG. 3 is an illustration of a method for automatically analyzing images in accordance with one embodiment of the present invention.

A method for processing images in accordance with one embodiment of the present invention is illustrated in method 300 of FIG. 3. The order of the steps of method 300 may be changed for different applications, and the method shown is intended to display only an example of image processing in one embodiment of the present invention. Method 300 begins with start step 305. Next, the number of images to use in the presentation is determined in step 310. In one embodiment of the present invention, all images received by the system in step 220 are used to generate the presentation. In another embodiment, more or less images are desirable because of the number of events in the events list received at step 210. When the audio events list received in step 210 and number of images received in step 220 do not match, the number of images and events can be changed. If the system determines that images need to be deleted, they may be deleted at step 310. As discussed above, images are chosen to be deleted such that it will have a minimal impact on the presentation.

Figure 4:
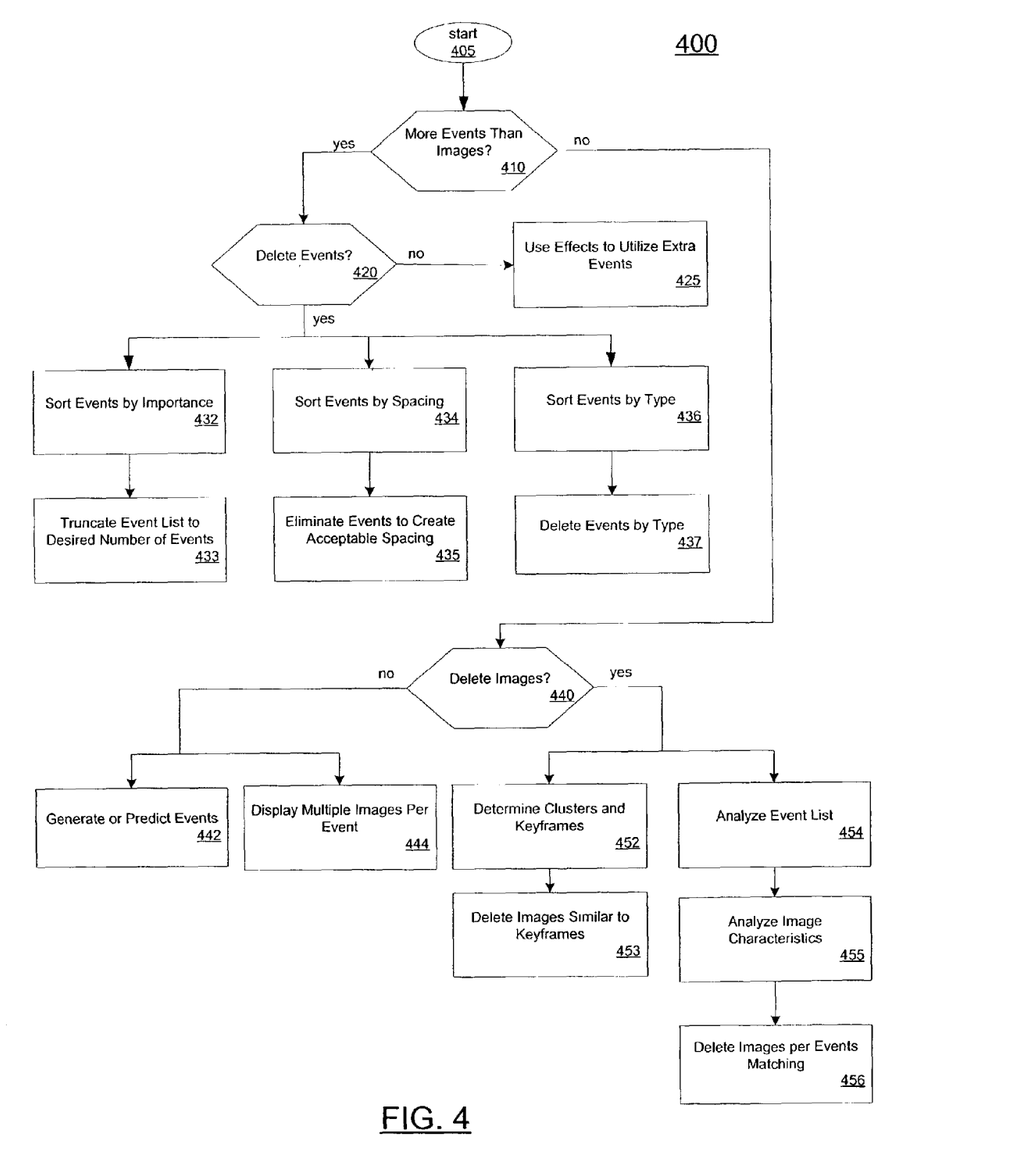
FIG. 4 is an illustration of a method for automatically determining the number of images to use in a multimedia presentation in accordance with one embodiment of the present invention.

In one embodiment, the number of images is determined according to method 400 of FIG. 4. In this embodiment, events list processing system 132 may automatically initialize a process for coordinating the number of events in the events list and the number of images received. Method 400 begins with start step 405. Next, the number of events in the events list and the number of images received are compared in step 410. If there are more events then images, operation continues to step 420. If there are more images then events, operation continues to step 440.

At step 420, ELPS determines whether events should be deleted. In one embodiment, this determination may be based on user input. In another embodiment, this determination may be made automatically. If made automatically, the ELPS may analyze the events list to determine the presence of any characteristics or pattern of characteristics that may suggest a logical means for deleting events. This may include analyzing the events list for importance ratings, spacing between events, and type of events present in the events list. If no events are to be deleted at step 420, operation continues to step 425 where the ELPS determines that effects will be incorporated into the presentation to utilize the extra events. The incorporation of effects into the images is discussed below in more detail with respect to step 330 of FIG. 3.

If the ELPS determines that events are to be deleted at step 420, events may be analyzed to be selected for deletion in several ways. In one embodiment, each event is associated with a numerical value in some manner. The numerical value can then be used to determine which events should be deleted, if any. In one embodiment, the numerical value is a score indicating importance. The ELPS may sort events by importance as shown in step 432. In one embodiment, importance may be the degree in change between two portions of audio on either side of a transition, the transition represented as the audio event. Alternatively, importance may also represent the magnitude of an audio feature or some other representation of an audio feature or characteristic. After sorting, the ELPS can then truncate the events list to a number of desired events such that only the most important or significant events remain at step 433. The resulting multimedia presentation generated based on the more important events will be a more dramatic and interesting presentation.

In another embodiment, the events list can be sorted by the spacing between the events as in step 434. In this case, the ELPS may generate a threshold value and determine which events are not spaced apart by at least the threshold value. Thus, the numerical value in this case may include time spacing between event or time stamp data. Alternatively, the ELPS may sort the events by the spacing between adjacent events, selecting the closest spaced events as those to be deleted. Events to be eliminated due to spacing are then eliminated in step 435. This may provide for a presentation where changes in the displayed image occur more evenly throughout the presentation while still being synchronized with the audio file. In another embodiment, the events list can be analyzed by a numerical value indicating event type as illustrated in step 436. Based on the types of events present and how many of each existed in the list, the ELPS could remove events accordingly. In one embodiment, events may be chosen for removal based on the frequency of that type of event. For example, an event list may comprise ten events: four crescendos, four diminuendos, one amplitude peak, and one change in timbre. If the number of events was required to be reduced to eight events, the ELPS may remove one crescendo event and one diminuendo event. This would still allow four different types of events to remain in the audio event list, thereby providing a variety of events to make the presentation more interesting. Alternatively, a particular type of event may be marked for removal. Thus, the ELPS may remove events in a certain order depending on type alone. The type of events to be removed may be determined from user input or by a default setting in the system.

In steps 432-437, the ELPS may eliminate events until a desired number of events is attained in the list. In one embodiment, the desired number of events may be the number of images to be used in the multimedia presentation. In another embodiment, the desired number of events may be slightly more or less than the number of images to be used depending on how many images are to be displayed at one time and any effects to incorporate into images in the presentation. Further, a combination of the deletion methods may be used to determine which events are to be removed. In one embodiment, a set of heuristics within the ELPS may be used to determine acceptable spacing between events in the events list and how events are deleted according to the importance of the event. Thus, between two events determined to occur too close together, the event rated as more important between the two events is retained while the less important event is deleted.

At step 440, the ELPS determines if images should be deleted. In one embodiment, this may be determined based upon user input indicating whether or not any images should be deleted. In another embodiment, the ELPS automatically determines whether any images may be deleted. The ELPS may receive input from the IPS in making this determination. In this embodiment, the IPS may analyze the images for clustering and key frames or other characteristics to determine if the image characteristics suggest a logical means for deleting events. For example, analyzing a set of images for cluster groups may result in the detection of four clusters, where each cluster has several images similar to others in that cluster, and wherein four images must be deleted from the set. Various clustering techniques based on similarity measures, such as agglomerative clustering using color histogram similarity, or hierarchical may be used to group the received images into an automatically or user determined number of clusters. In this case, the ELPS may automatically determine that images should be deleted because one image could be removed from each cluster without losing much original content that isn't captured in other images. If the ELPS determines no images should be deleted, then operation continues to step 442, 444 or both. If the ELPS determines that images should be deleted in step 440, then operation continues to step 452, 454, or both.

In one embodiment, if no images are to be deleted when there are more images then events, the system may predict or otherwise generate events in step 442. In one embodiment, events may be predicted by detecting patterns of related events, such as those occurring at predictably regular intervals. For example, a predictable audio characteristic may include a down beat. A song may be have a down beat pattern where a down beat occurs at two consecutive bars, skips a third bar, and then occurs again at a fourth bar. Though no down beat may be present at the third bar, it may be predicted that the third bar may be an event of interest in the audio file. Thus, an event may be created at the third bar. Events may also be generated based on the spacing between existing events, wherein no event is detected between a large temporal gap between two other events. In another embodiment where received images are not to be deleted, a determination can be made to display multiple images at the occurrence of one or more events as illustrated at step 444.

If the ELPS determines that images should be deleted at step 440, the IPS may delete images in several ways. In one embodiment, the IPS may analyze images to determine clusters of images in which a key frame may be selected in step 452. In this embodiment, clusters are determined such that the images in a single cluster have similar features to the key frame selected from that cluster. Once a keyframe is selected for a cluster, cluster images that are most similar to the key frame may be deleted in step 453. This provides for minimal content loss through deleted images. Images may be deleted in this manner from one or more clusters until a desired number of images is attained. In another embodiment, images may be deleted corresponding to how they match up with the event list. In this embodiment, the event list is analyzed in step 454. Analyzing the event list may include determining what types of events exist in the events list, such as amplitude related events, loudness events, or other event types. Images could then be analyzed in step 455 for features such as brightness, color scheme, and other features. The IPS or ELPS could then make a determination which images to delete based upon what images could potentially match to the events in the event list in step 456. For example, a presentation may have audio pitch related events matched to images by image color scheme, where high pitch events are matched with images having a warm color scheme and low pitch events are matched with images having a cool color scheme. If an event list included events indicating a change in the audio from high pitch to low pitch and a majority number of images with a warm color scheme and fewer images with a cool color scheme, the system may determine that the extra warm color scheme images should be deleted.

In steps 452-456, the ELPS may eliminate images until a desired number of images is attained. The desired number of images may be the number of events in the event list or slightly more or less depending on how many images are to be displayed at one time and any effects to incorporate into images in the presentation. Further, a combination of the deletion methods may be used to determine which images are to be removed. In one embodiment, a set of heuristics within the IPS may be used to determine clusters of images and how images are deleted according to their matching to the event list. Thus, between two images determined to be similar to a key frame in a cluster, the images rated as a better match to an event between the two images is retained while the other image is deleted.

Method 400 of FIG. 4 illustrates one method for automatically selecting images to be used in a multimedia presentation based on events lists and images in accordance with one embodiment of the present invention. Other embodiments may utilize fewer or alternate steps for deleting events or images or for managing extra images or events than those illustrated in FIG. 4. These other embodiments are considered within the scope of the present invention, and the illustration of one method as shown in FIG. 4 is not intended to limit the scope of the present invention.

After determining the number of images to be used in step 310, the ordering of the images is automatically determined in step 320. Image ordering may be accomplished in several ways. In one embodiment, the images may be ordered without performing any processing or analysis upon the image. This may include ordering the images according to how they were received, by lexicographic order of image file names, or according to time stamp information associated with each file. In another embodiment, the images may be analyzed to automatically determine their order. An illustration of this type of ordering in accordance with one embodiment of the present invention is shown in method 500 of FIG. 5.

Figure 5:
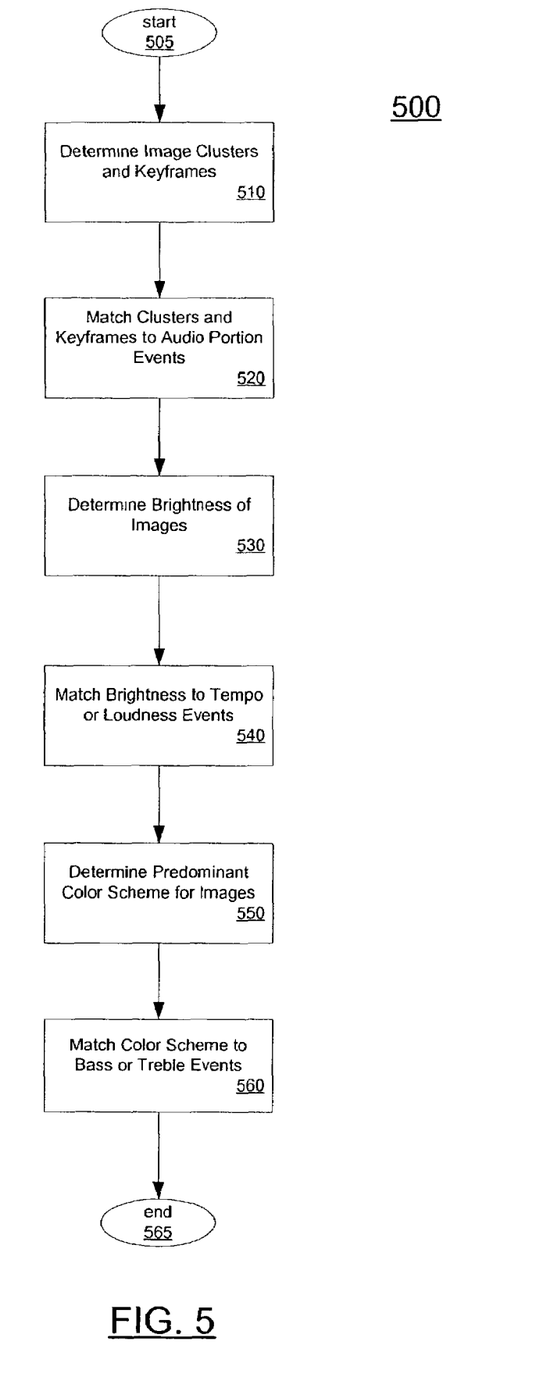
FIG. 5 is an illustration of a method for automatically determining the ordering of images for use in multimedia presentation in accordance with one embodiment of the present invention.

Method 500 depicts a method for detecting the ordering of images using image feature types and event types in accordance with one embodiment of the present invention. A matching scheme is generated whereby feature types are matched to event types. The matching scheme may be generated automatically or with user input. Images are then analyzed to detect image features for each image. An image may have image features that correspond to one feature type, multiple types, or no feature types that match to an event type. The images are then ordered to the events list corresponding to any detected features that correspond to feature types matched to event types. Method 500 for automatically determining the order of images to be matched with an audio events list in accordance with one embodiment of the present invention begins with start step 505. Next, image clusters and key frames are determined in step 510. The images received in step 220 can be analyzed for common features and grouped into clusters according to those features. Various clustering techniques based on similarity measures, including spectral clustering, or hierarchical agglomerative clustering may be used to group the received images into an automatically or user determined number of clusters. From these clusters, various keyframe selection algorithms or feature-based approaches can be used to determine one or more representative image for inclusion into the slide show. Once clusters and key frames, if any, are determined, they can be matched to event types or groups of events in step 520. A group of events may indicate the beginning and end of an audio portion. In one embodiment, the audio portions are chorus and verse sections of the audio file. The sections of the audio may be detected using a song structure analysis technique such as the techniques described in "A Method for Automatic Digital Music Summarization", U. S. patent application Ser.No. 10/271,407, by M. Cooper and J. Foote, filed on Oct. 15, 2002, incorporated herein by reference. Thus, one cluster may be matched with a verse section with a beginning and end marked by an event. A second cluster may be matched with a chorus section with a beginning and end marked by an event. In each case, additional events may exist between the events marking the beginning and end of the section.

The brightness of the images may then be determined as an image feature in step 530. The brightness of each image may be represented as an overall brightness value based on an averaging technique or an array of brightness values corresponding to different portions of the image. The images are then matched to tempo or loudness events by brightness in step 540. In one embodiment, images having a higher brightness value are matched to events indicating a faster tempo of audio, while images with lower brightness are matched to an event indicating a slower tempo. An image with a higher brightness could also be matched to an event indicating a high loudness, and lower brightness images can be matched to an event indicating a low loudness.

A color scheme may be determined as an image feature for each image in step 550. In one embodiment, determining the color scheme may include determining whether or not an image has predominantly warm colors such as yellows, reds, and oranges or predominantly cool colors such as blues, greens, and purples. Once a color scheme is determined, the images may be matched to events such as treble and bass events according to their color scheme in step 560. In one embodiment, images having predominantly cool colors may be matched to bass events and images having predominantly warm colors could be matched to treble events. Once the ordering of images is completed, operation ends at step 565.

Method 500 is intended to illustrate only one example of determining the order of the images with respect to the audio event list by matching image feature type to event type. Ordering the images by analyzing different image characteristics may be done in several ways. For example, only one image characteristic could be determined and matched to audio events instead of all three in method 500. Further, other audio events could be matched to the characteristics detected, such as crescendos, diminuendos, voice-related events as opposed to instrument related events, and others. These and other similar variations are within the scope of the present invention.

After the ordering of the images is determined in step 320, any effects to be incorporated into the images are determined and generated in step 330. Effects to be incorporated into images may include cropping, panning, zooming and other visual effects. In one embodiment, effects could be automatically incorporated into an image without requiring any analysis of the image. Examples of this type of effect include rotating an image, image fading, dissolving and wiping effects and adjusting the image brightness, color, or opacity. Fading may include fading an image out and then displaying the next image, or cross fading where one image is faded out while another is simultaneously faded in. A wiping effect may be a transition from one image to another image, where the transition can be viewed as a line "wiping" across the image. On one side of the wiping line is the image being replaced, and on the other side of the wiping line is the replacement image.

In another embodiment, effects may be incorporated into an image after analysis is performed on the image. Examples of these methods may include drift panning, detecting and panning towards a hot spot, panning in the direction of detected predominant spatial frequency, and zooming in to the center of a symmetrical region.

Automatic drift panning can be used to pan a viewing frame from one edge of an image to another. In one embodiment, the panning will end at an edge in the image such that the viewing frame includes something of interest to a viewer. The panning may cover an entire image, or may be incorporated when cropping is required. Either method may be useful in displaying an image that must be converted to a different aspect ratio. For example, an image received in a format having one aspect ratio, such as a photograph format, must be cropped to display the image in another format having a different aspect ratio, such as video format. In this case, a viewing window complying with the resulting aspect ratio can be used to pan across the image to allow a viewer to see content lost due to cropping from the original image.

Figure 6A:
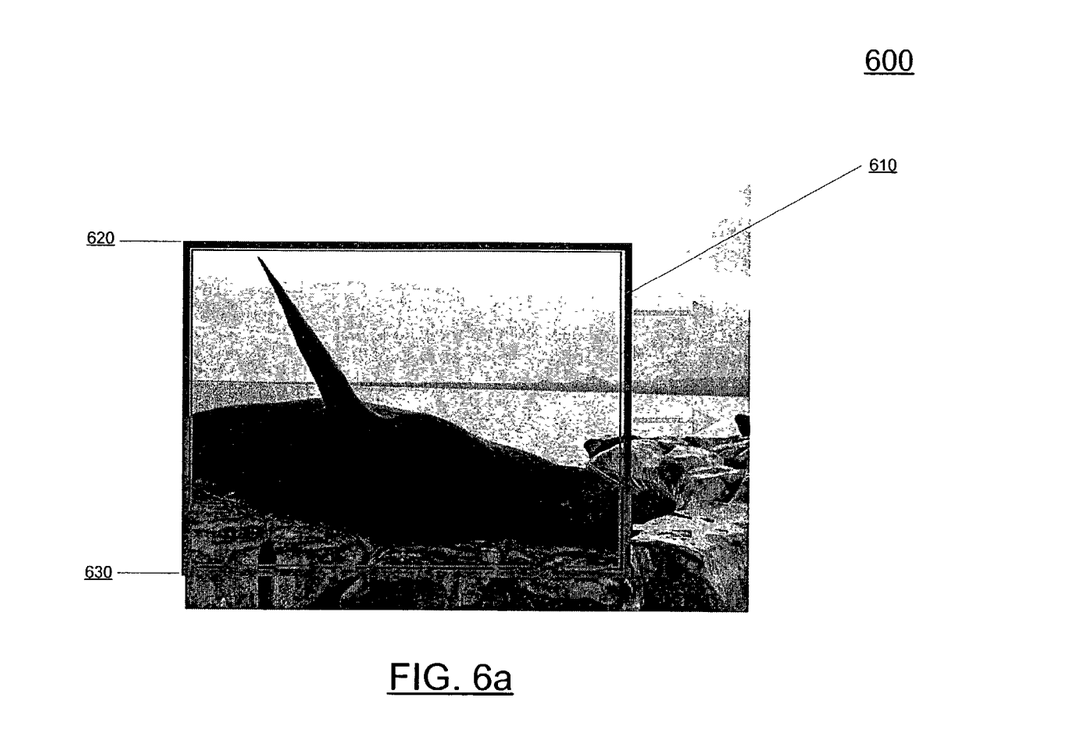
FIG. 6a is an illustration of an image incorporating drift panning in accordance with one embodiment of the present invention.
Figure 6B:
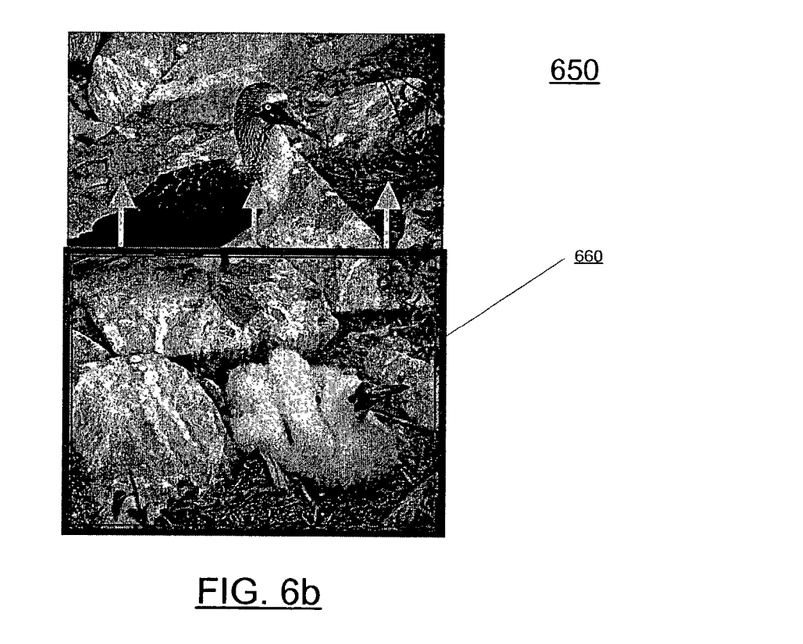
FIG. 6b is an illustration of an image incorporating drift panning in accordance with one embodiment of the present invention.

An example of an image where automatic drift panning can be incorporated with cropping is illustrated in FIG. 6a. Image 600 of FIG. 6a depicts a seal lying on a rock. In image 600, viewing frame 610 is used to pan from the left edge of the image to the right edge of the image. Accordingly, the viewing window has been selected such that the image can be cropped to an upper edge 620 and a lower edge 630 and panning can occur from left to right, capturing the entire image of the seal while complying with the aspect ratio used in the resulting presentation. Another example of drift panning is illustrated in image 650 of FIG. 6b. In image 650, the viewing window 660 is chosen to fit into the lower portion of the image. The viewing window may be chosen such that it complies with the aspect ratio of the displayed image in the multimedia presentation. The viewing window can then be moved upwards in the image to pan to the upper edge of the image. Thus, though the viewing window 660 complying with the aspect ratio of the final image does not display the entire image, the "lost" image content is displayed through panning. The speed of the panning may be matched between two audio events such that the time duration of the pan from one edge to another edge of the image will last approximately the duration between the two audio events. In another embodiment, the panning effect can be generated such that the panning stops or starts at the approximate time of an event, but not both. Thus, a portion of the presentation may feature a still frame of an image for a few seconds, then a panning effect that stops at the occurrence of an event. The panning need not start at the time of an event. Conversely, panning or some other effect could begin at the occurrence of an event and end at some time a few seconds later, the panning or effect not concurring with an event.

Hot spots can also be used in generating automatic panning techniques. The hot spot can be any portion of the image that may be of interest. The hot spot may be detected automatically using feature detection techniques or from user interaction. The image 700 of FIG. 7 illustrates an image where automatic panning to a hot spot may be incorporated.

Figure 7:
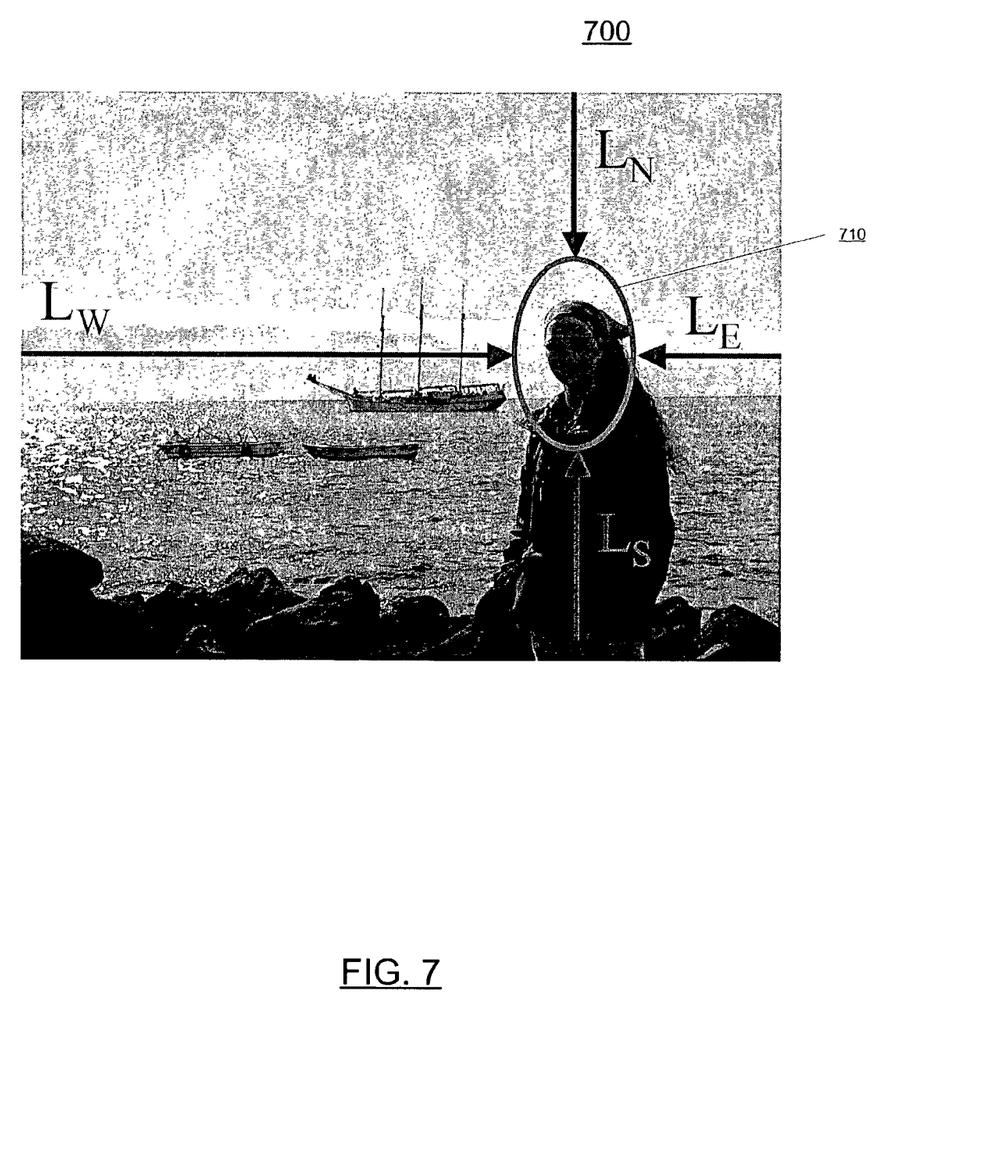
FIG. 7 is an illustration of an image incorporating panning and hot spots in accordance with one embodiment of the present invention.

The image of FIG. 7 depicts a person against a landscape background. A portion 710 of the image that includes a close-up of a human face may be selected automatically as the hot spot. Various human face detection techniques could be used to detect a human face as a hot spot, such as the technique described in "Example-Based Learning for View-Based Human Face Detection", K. K. Sung and T. Poggio, Massachusetts Institute of Technology, December 1994. Once a viewing frame containing the hot spot is determined, the direction from which to pan to the hot spot is determined. In one embodiment, this direction chosen is the direction towards the edge furthest away from the hot spot. This method may capture interesting elements in the image located away from the hot spot such as interesting landscape or scenery. In the embodiment shown in FIG. 7, only north, south, east and west directions are displayed. However, other directions could be considered as well. The direction to the edge having the furthest length from the hot spot is determined to be the panning direction. In the embodiment shown in FIG. 7, the length $L_W$ in the westward direction is the longest of $L_W$, $L_N$, $L_E$ and $L_S$. Thus, the automatically determined viewing frame would be automatically determined to pan from the west edge of the image over length $L_W$ to the detected human face hot spot 710. If the directions considered are relatively similar, then a zooming in or out effect could be incorporated into the image instead of a panning effect.

Figure 8A:
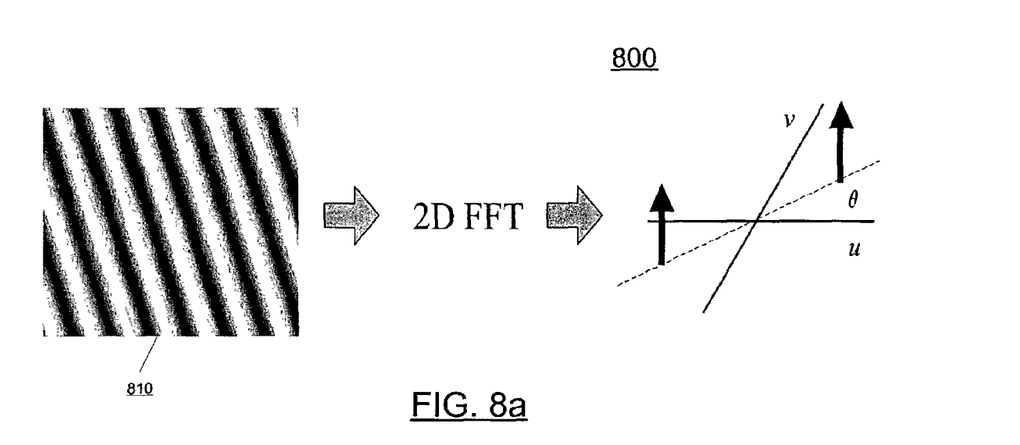
FIG. 8a is an illustration of an determining panning by analyzing the angular distribution of spatial frequencies of an image in accordance with one embodiment of the present invention.
Figure 8B:
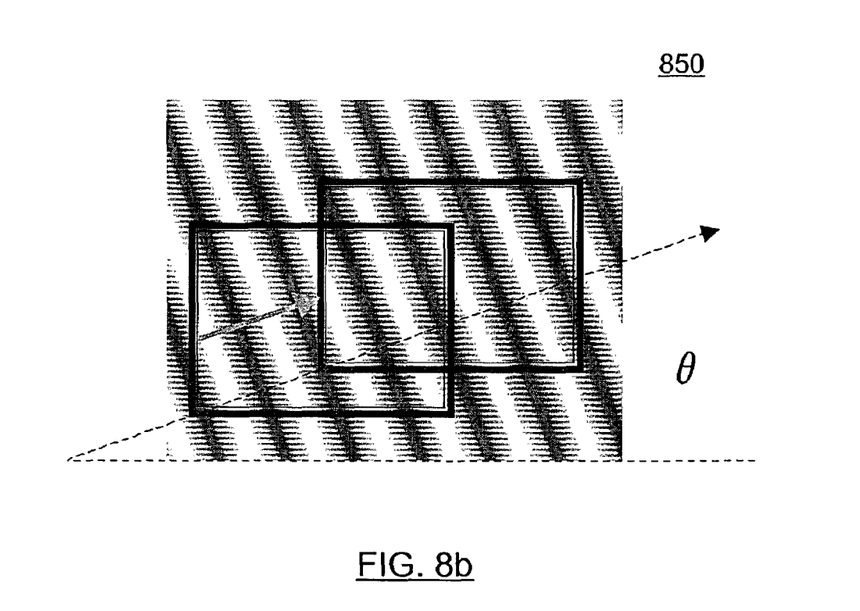
FIG. 8b is an illustration of an image that incorporates angular distribution of spatial frequencies to determine panning in accordance with one embodiment of the present invention.

In another embodiment, panning may be automatically determined by analyzing the angular distribution of spatial frequencies within the image. A two-dimensional Fourier transform provides the phase and magnitudes of frequency components of an image as well as their spatial direction. Image 800 of FIG. 8a and 850 of FIG. 8b illustrate an example of using a two-dimensional Fourier transform to determine panning direction. A sinusoidal image component 810 will produce two strong peaks in the frequency plane. The angle of the sinusoidal component can be determined from the angle θ of the peaks with respect to the frequency coordinates. Panning a viewing window in this direction will produce movement in the direction of the major frequency component. To determine this direction, a "directional margin" can be computed by summing the magnitudes of the Fourier transform in the radial direction from the origin in the frequency plane. The direction with the largest sum is chosen as the direction in which to pan the viewing window as shown in FIG. 8b. This ensures a panning effect with the highest visual change and corresponding visual interest. For example, a photograph may contain horizontal components of a beach, ocean and sky. The largest margin in this photograph will be in the vertical direction, and panning in the vertical direction will yield the more visual change (beach, ocean, sky) than in the horizontal direction. The values used to determine the Fourier magnitudes may be pixel intensity values, an average of pixel intensity values taken from strips in the image, or some other value that varies throughout the image corresponding to the image display.

In the absence of a panning effect, hot spots can be used to crop a picture to best effect. For example, an image can be analyzed to determine the presence of a hot spot. Once detected, the image can be cropped so that the detected hot spot is centered, symmetrical, or otherwise featured in the image.

Figure 9A:
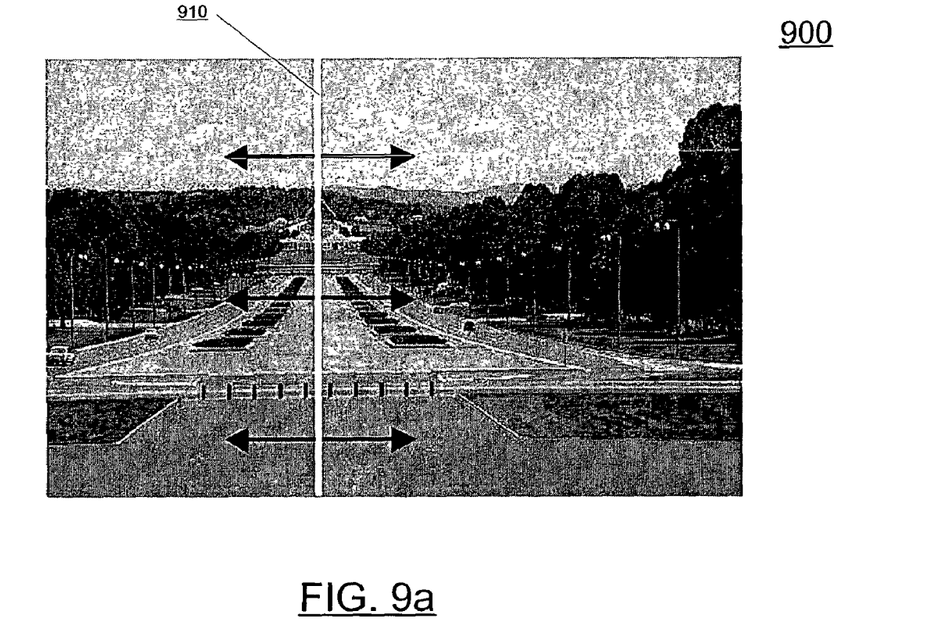
FIG. 9a is an illustration of image incorporating symmetry detection in accordance with one embodiment of the present invention.
Figure 9B:
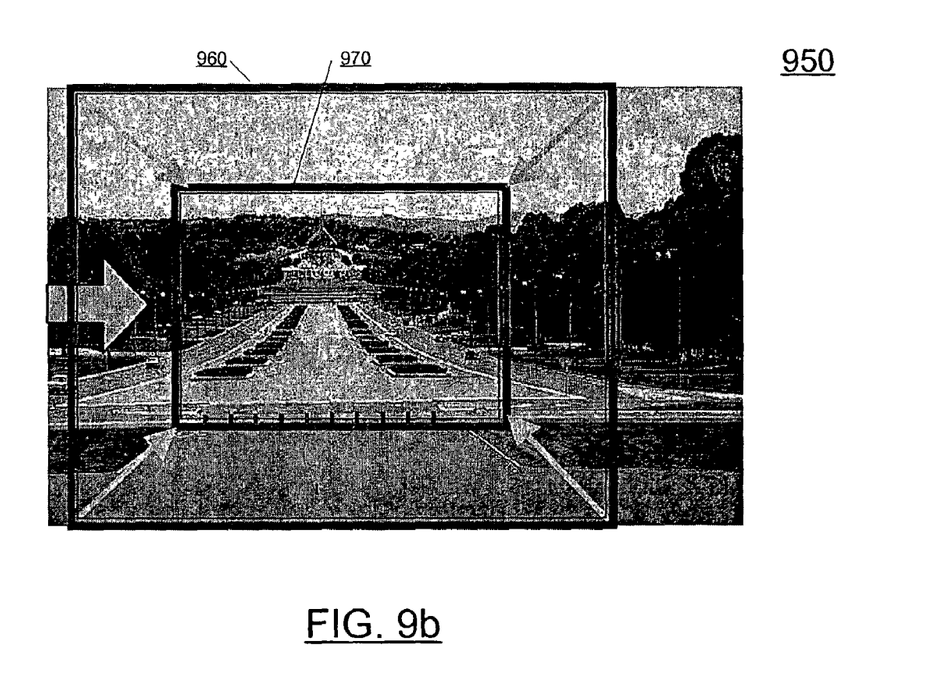
FIG. 9b is an illustration of incorporating zooming into a symmetrical image in accordance with one embodiment of the present invention.

Another effect that can be incorporated into an image in accordance with one embodiment of the present invention is zooming. As discussed above, if a hot spot or key feature is detected or otherwise known, a zoom in or out of the region can focus interest on the hot spot region. In addition to hot spots and key features, symmetry can be used with zooming to focus attention to a region. Several techniques can be used to automatically determine symmetry in an image, including "Symmetry as a Continuous Feature", by H. Zabrodsky et al., IEEE Trans. Pattern Analysis and Machine Intelligence, August 1993, herein incorporated by reference. Many photographers capture pictures having symmetry, including human faces, vehicles, automobiles, animals, architectural structures such as doors, buildings, windows and bridges, natural objects such as trees, and landscapes such as mountains and sunsets. In the case of streets, roads, rivers and paths that are photographed axially in the direction they extend, a zoom into the center has the visual effect of moving along the path or travel way. An example of automatic zooming determined from detected symmetry is shown in image 900 of FIG. 9a and image 950 of image 9b. A symmetry along a vertical line at 910 is detected in image 910. A zooming effect can then be performed from beginning outer frame 960 to the final inner frame 970. Alternatively, a zooming effect or operation can be incorporated from the inner frame to the outer frame.

The present invention provides a system and method for automatically combining image and audio data to create a multimedia presentation. In one embodiment, audio and image data are received by the system. The audio data includes a list of events that correspond to points of interest in an audio file. The audio data may also include an audio file or audio stream. The received images are then matched to the audio file or stream using the time. In one embodiment, the events represent times within the audio file or stream at which there is a certain feature or characteristic in the audio file. The audio events list may be processed to remove, sort or predict or otherwise generate audio events. Images processing may also occur, and may include image analysis to determine image matching to the event list, deleting images, and processing images to incorporate effects. Image effects may include cropping, panning, zooming and other visual effects.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing at least one of additive model representation and reconstruction.

The invention claimed is:

1. A method for automatically generating a multimedia presentation, comprising:
   receiving a list of events, the events containing time information regarding events occurring in audio data;
   receiving images;
   automatically generating a multimedia presentation that includes a presentation of the images, the presentation of the images automatically synchronized with the audio data using the events list;
   processing the images, wherein processing the images includes automatically determining the number of images to use in the multimedia presentation;
   determining a numerical value associated with each event, wherein the numerical value is an importance score; and
   processing the list of events, wherein processing the list of events includes sorting the events according to the numerical value; wherein processing the list of events includes decreasing the list of events by deleting events when there are more events than images wherein the events to be deleted are selected based on the numerical value.

2. The method of claim 1 wherein automatically determining the number of images to use includes deleting images if there are more images than events.

3. The method of claim 2 wherein deleting images includes:
   detecting a cluster of images within the received images, the cluster including a key frame; and
   deleting an image within the detected cluster of images, the deleted image most similar to the cluster keyframe.

4. The method of claim 2 wherein deleting images includes:
   automatically determining matching image features to match to events in the events list;
   analyzing images to detect features; and
   deleting images based on the matching image features and detected features.

5. The method of claim 1, wherein processing the images includes automatically determining the order of images to use in the multimedia presentation.

6. The method of claim 5 wherein each of the images has at least one image feature, each image feature associated with a feature type, each event within the events list associated with an event type, wherein automatically determining the order includes:
   (a) matching a feature type to an event type;
   (b) automatically analyzing the images to detect image features for each image; and
   (c) automatically determining the order of the images by matching an image to an event in the event list, wherein a feature of the matched image is associated with the matched feature type from step (a) and the matched event is associated with the matched event type from step (a).

7. The method of claim 6 wherein image feature types include brightness, color scheme, and association with a cluster.

8. The method of claim 6 wherein event types include amplitude peaks, loudness, bass, treble, crescendos, and diminuendos.

9. The method of claim 1 further comprising processing the images, wherein processing the images includes automatically determining an effect to incorporate into an image displayed in the multimedia presentation.

10. The method of claim 9 wherein determining an effect includes configuring the effect to begin upon the occurrence of an event in the event list.

11. The method of claim 9 wherein determining an effect includes configuring the effect to end upon the occurrence of an event in the event list.

12. The method of claim 9 wherein an effect includes panning a viewing window within an image.

13. The method of claim 12 wherein the image is received in a first format having a first aspect ratio, the image displayed in the multimedia presentation in a second format having a second aspect ratio, the viewing window configured to be in the second aspect ratio.

14. The method of claim 12 wherein panning includes panning from an edge to a hot spot.

15. The method of claim 14 wherein panning includes:
   detecting a hot spot within the image;
   determining an edge of the image furthest from the hot spot;
   panning the viewing window from the edge furthest from the hot spot to an edge closest to the hot spot.

16. The method of claim 12 wherein panning a viewing window includes:
   detecting the angular distribution of spatial frequency from a location within the image; and
   panning the viewing window from the location along a direction having the highest spatial frequency.

17. The method of claim 16 wherein zooming includes:
   detecting a hot spot within the image; and
   performing a zoom operation on the hot spot.

18. The method of claim 16 wherein zooming includes:
   detecting symmetry within the image, the symmetry having a center; and
   performing a zoom operation on the center.

19. The method of claim 9 wherein the effect includes zooming.

20. A computer program product comprising storage medium for storing computer code, for execution by a server computer, for automatically generating a multimedia presentation, the computer code comprising:
   computer code for receiving a list of events, the events containing time information regarding events occurring in audio data;
   computer code for receiving images;
   computer code for automatically generating a multimedia presentation that includes a presentation of the images, the presentation of the images automatically synchronized with the audio data using the events list;
   computer code for processing the images, wherein the computer code for processing the images includes computer code for automatically determining the number of images to use in the multimedia presentation wherein the computer code for automatically determining the number of images to use includes computer code for analyzing the images, wherein the computer code for analyzing the images includes computer code for detecting one or more image feature selected from the group consisting of clustering, color histogram similarity, hierarchy and key frames; and computer code for processing the list of events, wherein the computer code for processing the list of events includes computer code for matching the image features and the list of events and computer code for deleting images when there are more images than events, wherein the computer code for deleting images utilizes the image feature to determine images to delete, wherein the computer code for deleting images further includes:

computer code for detecting an image feature, wherein the image feature is a cluster of images within the received images, the cluster including a key frame; and computer code for deleting an image within the detected cluster of images, the deleted image most similar to the cluster keyframe.

21. The computer program product of claim 20, wherein the computer code for automatically determining the number of images to use includes:

computer code for sorting the events according to a importance score associated with each event; and computer code for deleting events according to the importance score associated with each event.

22. The computer program product of claim 20 further comprising computer code for processing the images, wherein computer code for processing the images includes automatically determining the order of images to use in the multimedia presentation.

23. The computer program product of claim 22 wherein each of the images has at least one image feature, each image feature associated with a feature type, each event within the events list associated with an event type, wherein computer code for automatically determining the order includes:

(a) computer code for matching a feature type to an event type;

(b) computer code for automatically analyzing the images to detect image features for each image; and (c) computer code for automatically determining the order of the images by matching an image to an event in the event list, wherein a feature of the matched image is associated with the matched feature type from step (a) and the matched event is associated with the matched event type from step (a).

24. The computer program product of claim 20 further comprising computer code for processing the images, wherein computer code for processing the images includes automatically determining an effect to incorporate into an image displayed in the multimedia presentation.

25. The computer program product of claim 24 wherein an effect includes panning a viewing window within an image, the image received in a first format having a first aspect ratio, the image displayed in the multimedia presentation in a second format having a second aspect ratio, the viewing window configured to be in the second aspect ratio.

26. The computer program product of claim 25 wherein computer code for panning includes panning from an edge to a hot spot.

27. The computer program product of claim 25 wherein computer code for panning a viewing window includes:

computer code for detecting the angular distribution of spatial frequency from a location within the image; and computer code for panning the viewing window from the location along a direction having the highest spatial frequency.

28. The computer program product of claim 24 wherein the effect includes zooming.

29. A method for automatically generating a multimedia presentation, comprising:

generating a list of events, the events containing time information regarding events occurring in audio data;

receiving images;

automatically generating a multimedia presentation that includes a presentation of the images, determining a defined number a clusters of images, wherein the clustering is determined using similarity analysis, the presentation of the defined number of clusters of images automatically synchronized with the audio data using the list of events; and processing the defined number of clusters of images, wherein processing includes decreasing the number of images in a cluster by deleting images when there are more images than events.

30. The method of claim 29, wherein processing the images includes automatically determining the number of images to use in the multimedia presentation.

31. The method of claim 30 wherein automatically determining the number of images to use includes deleting events when there are more events than images.

32. The method of claim 29, wherein the similarity analysis is based on agglomerative clustering using color histogram similarity.

* * * * *